United States Patent
Kikuzawa (10) Patent No.: US 6,982,755 B1
(45) Date of Patent: Jan. 3, 2006

(54) IMAGE SENSING APPARATUS HAVING VARIABLE NOISE REDUCTION CONTROL BASED ON ZOOM OPERATION MODE

(75) Inventor: Masahiko Kikuzawa, Soka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/487,868

(22) Filed: Jan. 20, 2000

(30) Foreign Application Priority Data

Jan. 22, 1999 (JP) ................................ 11-013945

(51) Int. Cl.
*H04N 5/262* (2006.01)
*H04N 5/217* (2006.01)

(52) U.S. Cl. .................................... 348/241; 348/240.1
(58) Field of Classification Search ................. 348/241, 348/347, 240.99, 240.1, 240.2, 208.1, 208.16, 348/208.4
See application file for complete search history.

(56) References Cited

U.S. PATENT DOCUMENTS

| | | | | |
|---|---|---|---|---|
| 5,140,424 A | * | 8/1992 | Yoshimura et al. | 348/620 |
| 5,345,264 A | * | 9/1994 | Murata et al. | 348/235 |
| 5,608,703 A | * | 3/1997 | Washisu | 348/208.11 |
| 6,072,525 A | * | 6/2000 | Kaneda | 348/208.14 |
| 6,348,948 B1 | * | 2/2002 | Kyuma | 348/240.1 |

* cited by examiner

*Primary Examiner*—Thai Tran
*Assistant Examiner*—Timothy J. Henn
(74) *Attorney, Agent, or Firm*—Fitzpatrick, Cella, Harper & Scinto (57) ABSTRACT

An image sensing apparatus and method which controls a noise reduction process under various photographing conditions and various functions of the apparatus, including a system control unit that controls a noise reduction unit by setting the noise reduction control mode to a zoom stop mode under conditions that an electronic zoom unit and a zoom lens are stopped, and controls the noise reduction unit by setting the noise reduction control mode to a zoom operation mode under conditions that either the electronic zoom unit or the zoom lens is operated.

11 Claims, 10 Drawing Sheets

| DIRECTORY INFORMATION |
|---|
| PROGRAM MODULE OF NOISE REDUCTION CONTROL PROCESSING SHOWN IN FIGS. 4 AND 5 |
| TABLE VALUE OF CYCLIC COEFFICIENT SHOWN BY GRAPH IN FIG. 6 |
| TABLE VALUE OF CYCLIC COEFFICIENT SHOWN BY GRAPH IN FIG. 7 |
| ⋮ |

IMAGE SENSING APPARATUS HAVING VARIABLE NOISE REDUCTION CONTROL BASED ON ZOOM OPERATION MODE

BACKGROUND OF THE INVENTION

1. Field of the Invention

The present invention relates to an image sensing apparatus having a noise reduction circuit, and to a control method for such an image sensing apparatus. The present invention also relates to a storage medium storing a program for sensing an image of an object, which program is executed by a CPU of an image sensing apparatus.

2. Related Background Art

A conventional video camera has a noise reduction circuit for removing noise from a video signal. Noise reduction circuits, as well as various other video signal processing circuits, are now made of digital components along with the advent of digital video (DV) cassettes (SD format) and the like.

A cyclic type signal processing circuit, using a field memory, is generally used for a digital noise reduction circuit. As the price of memory is declining with time, digital noise reduction circuits also are being used for general video cameras in home use.

Figure 3:
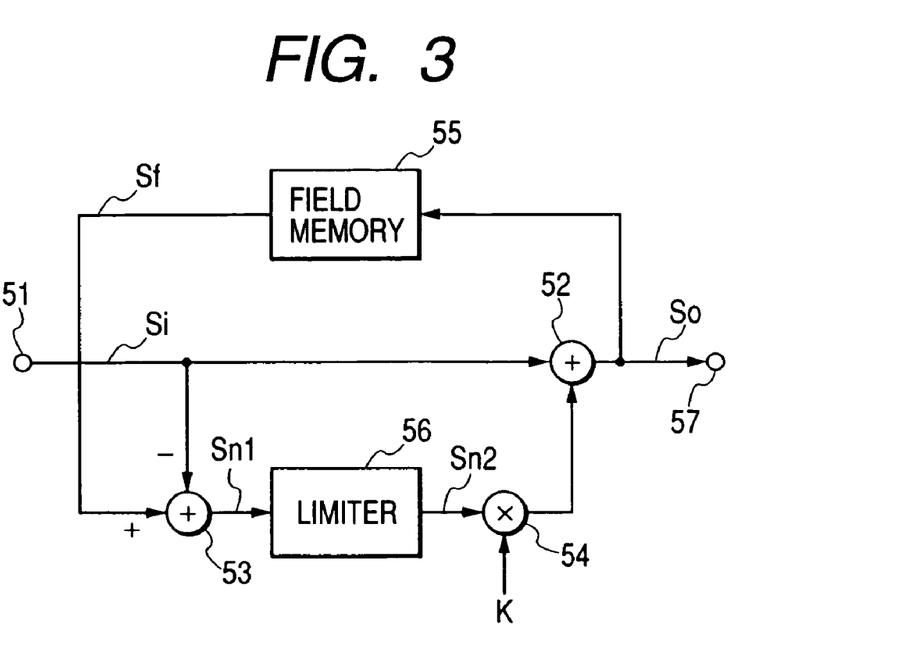
FIG. 3 is a block diagram showing the structure of a cyclic type noise reduction circuit.

A cyclic type noise reduction circuit will be described which removes noise using field images having a correlation in time. As shown in FIG. 3, a cyclic noise reduction circuit has an input terminal 51, an adder 52, a subtractor 53, a multiplier 54, a field memory 55, a limiter 56 and an output terminal 57.

A signal Si input at the input terminal 51 is supplied to the adder 52 and subtractor 53. The subtractor 53 subtracts the signal Si from a signal Sf, where Sf is a delayed signal output by the field memory 55, to thereby detect a noise signal Sn1 between fields. The detected signal Sn1 output by the subtractor 53 is supplied to the limiter 56.

Motion components contained in the signal Sn1 are eliminated by the limiter 56, which outputs a signal Sn2. This signal Sn2 is multiplied by an externally supplied coefficient K (hereinafter called a cyclic coefficient) by the multiplier. This signal K·Sn2 is supplied to the adder 52.

The adder 52 adds the signal Si to the signal K·Sn2 to remove noise components from the signal Si. A signal So output from the adder 52 is supplied to the field memory 55 and also is output from the output terminal 57.

For simplification of description, it is assumed that Sn1=Sn2=Sn. The signal Sn is therefore given by the following equation:

$$Sn = Sf - Si \quad (1)$$

The signal So is given by the following equation:

$$So = Si + K \cdot Sn$$
$$= Si + K \cdot (Sf - Si)$$
$$= (1-K) \cdot Si + K \cdot Sf \quad (2)$$

As seen from the equation (2), a signal So having less noise components can be obtained as follows. Since the signal Si contains noise components and the signal Sf is a delayed signal corresponding to the signal So, from which noise components have been eliminated, the noise components become smaller as the cyclic coefficient K approaches the value 1. If the cyclic coefficient K is set to 0, the signal Si becomes the signal So.

The more effectively the noise components can be removed, the more the cyclic coefficient K can be made to approach the value 1. A video signal generated by a video camera is more likely to be affected by noise, because of high density mounting of small components, high speed digitalization, high speed signal processing, and high speed component control. In order to avoid this, it is required to set the amount of noise reduction larger.

However, if the amount of noise reduction is made larger, although the noise reduction effect is improved, influence of a preceding field upon a current field becomes larger. Therefore, a latent image of a scene having a moving object becomes conspicuous.

This problem also occurs when a zoom operation is performed because the size of an object changes between successive fields even if the object does not move.

SUMMARY OF THE INVENTION

It is an object of the present invention to provide an image sensing apparatus capable of sensing an image of an object always in good condition by realizing an optimum noise reduction process even under various photographing conditions and even with various functions of the apparatus, a control method for the apparatus, and a storage medium storing a program for realizing such a function.

In order to achieve the above objects of the present invention, according to one aspect of the invention, there is provided an image sensing apparatus which comprises: noise reduction means for reducing noise of a sensed image utilizing images having a correlation in time; zoom control means for controlling a zoom magnification factor of the image sensing apparatus; judging means for judging whether the zoom control means is executing a zoom operation; and setting means for setting a control value for the noise reduction means in accordance with a judgment result by the judging means.

According to another aspect of the invention, there is provided an image sensing method which comprises the steps of: reducing noise of an image sensed by an image sensing apparatus utilizing images having a correlation in time; controlling a zoom magnification factor of the image sensing apparatus; judging whether the zoom control step is executing a zoom operation; and setting a control value for the noise reduction step in accordance with a judgment result of the judging step.

In another aspect, the present invention relates to a storage medium storing a program for executing an image sensing method which comprises the steps of: reducing noise of an image sensed by an image sensing apparatus utilizing images having a correlation in time; controlling a zoom magnification factor of the image sensing apparatus; judging whether the zoom control step is executing a zoom operation; and setting a control value for the noise reduction step in accordance with a judgment result of the judging step.

Other objects and advantages of the present invention will become apparent from the following detailed description when read in conjunction with the accompanying drawings.

DETAILED DESCRIPTION OF THE PREFERRED EMBODIMENTS

Figure 1:
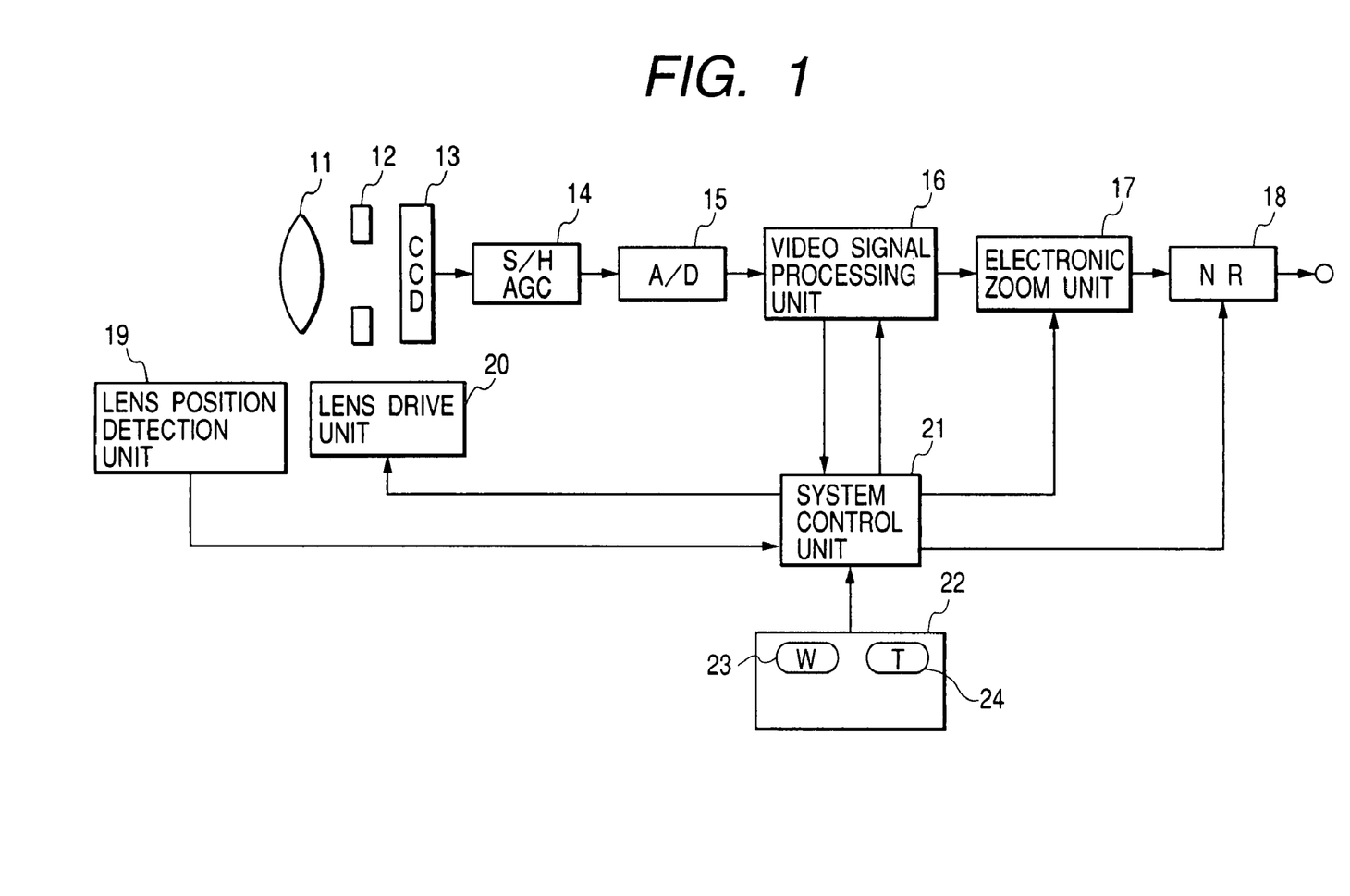
FIG. 1 is a block diagram showing the structure of an image sensing apparatus according to one embodiment.

Preferred embodiments of an image sensing apparatus, a control method therefor and a storage medium according to the present invention will be described. FIG. 1 is a block diagram showing the structure of an image sensing apparatus. In FIG. 1, reference numeral 11 represents a zoom lens for focusing the image of an object, reference numeral 12 represents a diaphragm for adjusting a light quantity, reference numeral 13 represents an image pickup device made of a CCD for converting input light into an electric signal, and reference numeral 14 represents a sample/hold AGC circuit for sample/hold and gain adjustment.

Reference numeral 15 represents an analog-digital (A/D) converter unit for A/D conversion, and reference numeral 16 represents a video signal processing unit for processing a signal and generating a video signal. Reference numeral 17 represents an electronic zoom unit having a field memory for image cut and paste, magnification, and interpolation. Reference numeral 18 represents a noise reduction (NR) unit having a field memory for reducing noise from a video signal. Reference numeral 19 represents a lens position detection unit for detecting the position of the zoom lens 11, and reference numeral 20 represents a lens drive unit for driving the zoom lens 11.

Figure 2:
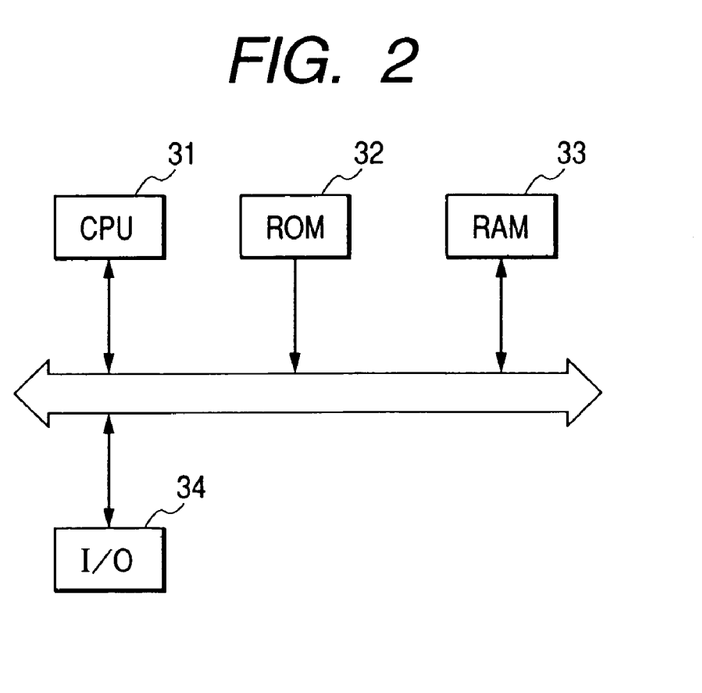
FIG. 2 is a block diagram showing the structure of a system control unit.

Reference numeral 21 represents a system control unit for controlling the entirety of the image sensing apparatus. FIG. 2 is a block diagram showing the structure of the system control unit 21. The system control unit 21 has a CPU 31, a ROM 32, a RAM 33 and an I/O interface 34 which are well known in the art. ROM 32 stores programs and table values to be described later, the programs being executed by CPU 31.

Referring again to FIG. 1, reference numeral 22 represents a zoom operation key unit having keys for zoom operations. Reference numeral 23 represents a wide-angle zoom key for moving the zoom lens in a wide-angle (wide=image reduction) zoom direction, and reference numeral 24 represents a telephoto zoom key for moving the zoom lens in a telephoto (telephoto=image magnification) zoom direction. In the present example, the wide-angle zoom key 23 and telephoto zoom key 24 are keys of a see-saw type moving together. Each key outputs a signal representative of a depression pressure to the system control unit 21. The noise reduction (NR) unit 18 is made of a conventional cyclic type noise reduction circuit. FIG. 3 shows the structure of a cyclic type noise reduction circuit. The noise reduction circuit has an input terminal 51, an adder 52, a subtractor 53, a multiplier 54, a field memory 55, a limiter 56 and an output terminal 57. The operation of the cyclic type noise reduction circuit has been described in connection with the related art.

Light from an object received by the zoom lens 11 is adjusted in amount by the diaphragm 12 and focused on the surface of the image pickup device 13. After the light is converted into an electric signal by the image pickup device 13, the electric signal is supplied to the sample/hold AGC unit 14, A/D converted by the A/D converter unit 15, and input to the video signal processing unit 16.

The video signal processing unit 16 performs aperture correction, gamma correction, white balance correction and the like for each brightness and color component of an input signal, thereby to generate a video signal which is output to the electronic zoom unit 17. The electronic zoom unit 17 performs image cut and paste, magnification, and interpolation using the field memory so that an output image has a magnification factor relative to an input image. The magnification factor being determined by a control signal supplied from the system control unit 21.

The noise reduction unit 18 reduces noise in the video signal in response to a control signal supplied from the system control unit 21. The noise reduced video signal is output to a recorder or the like connected to the noise reduction unit 18.

The system control unit 21 controls each component of the image sensing apparatus. As the wide-angle zoom key 23 or telephoto zoom key 24 of the zoom operation key unit 22 is depressed, the system control unit 21 also controls the lens drive unit 20 or electronic zoom unit 17 so as to move the zoom lens 11 in the wide-angle or telephoto zoom direction.

The system control unit 21 judges, from a lens position detection signal supplied from the lens position detection unit 19, at which position (zoom magnification factor) including the telephoto end (furthest telephoto end) and wide-angle end (widest angle end), the zoom lens is located. A function of magnifying an image picked up with a lens optical system is called an optical zoom, whereas a function of vertically and horizontally magnifying an image by an electronic signal process without using the lens optical system is called an electronic zoom.

The system control unit 21 generally performs optical zoom by driving the zoom lens 11 in the range of a magnification factor which can be set with the optical zoom. After the zoom lens 11 arrives at the telephoto end (maximum optical telephoto), the image further may be electronically magnified by electronic zoom under the control of the electronic zoom unit 17. In this embodiment, the maximum magnification factor of the optical zoom is set to 12 times and the maximum magnification factor of the electronic zoom is set to 4 times, so that zoom operation with a maximum magnification factor of 48 times is possible.

The system control unit 21 outputs a noise reduction control signal to the noise reduction unit 18, the control signal being set differently in the case where the optical and electronic zooms are stopped, and in the case where the optical and electronic zooms are operated, so that the amount of noise reduction can be changed. The noise reduction control signal corresponds to the cyclic coefficient K.

This control signal is also changed in accordance with a change in the brightness of an object. Ths S/N ratio of a video signal decreases as the brightness of an object becomes darker. In order to compensate for this, the control signal is changed to make the noise reduction amount larger.

In order to maintain the level of a video signal at a predetermined value even if the amount of input light from an object changes, the system control unit 21 controls the diaphragm 12, the sample/hold AGC unit 14, an electronic shutter (not shown in FIG. 1) and the like by determining the brightness of the object collectively from a diaphragm value, an AGC gain, an electronic shutter speed and the like (hereinafter called exposure control data) used for exposure control.

Figure 4:
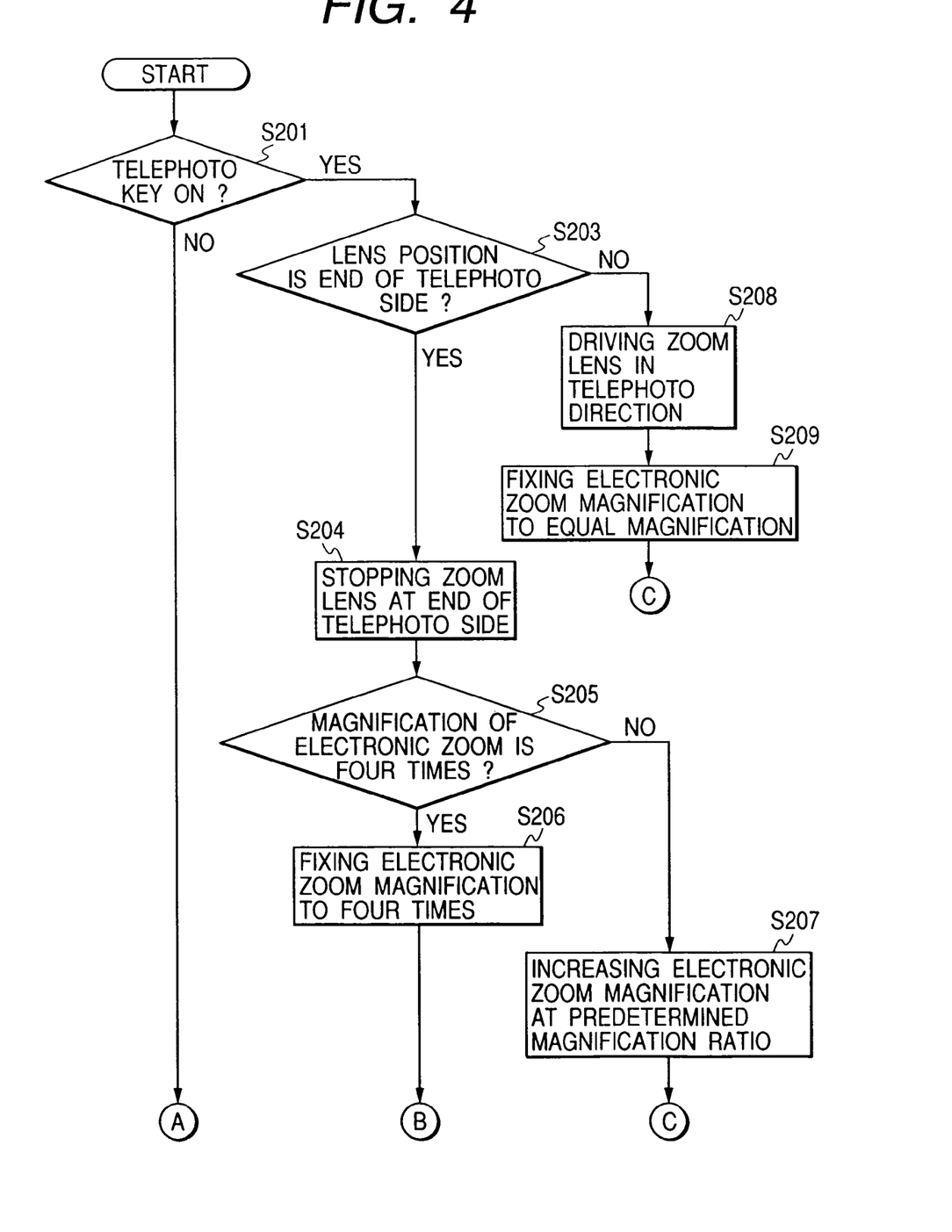
FIG. 4 is a flow chart illustrating the sequence of a noise reduction control process.
Figure 5:
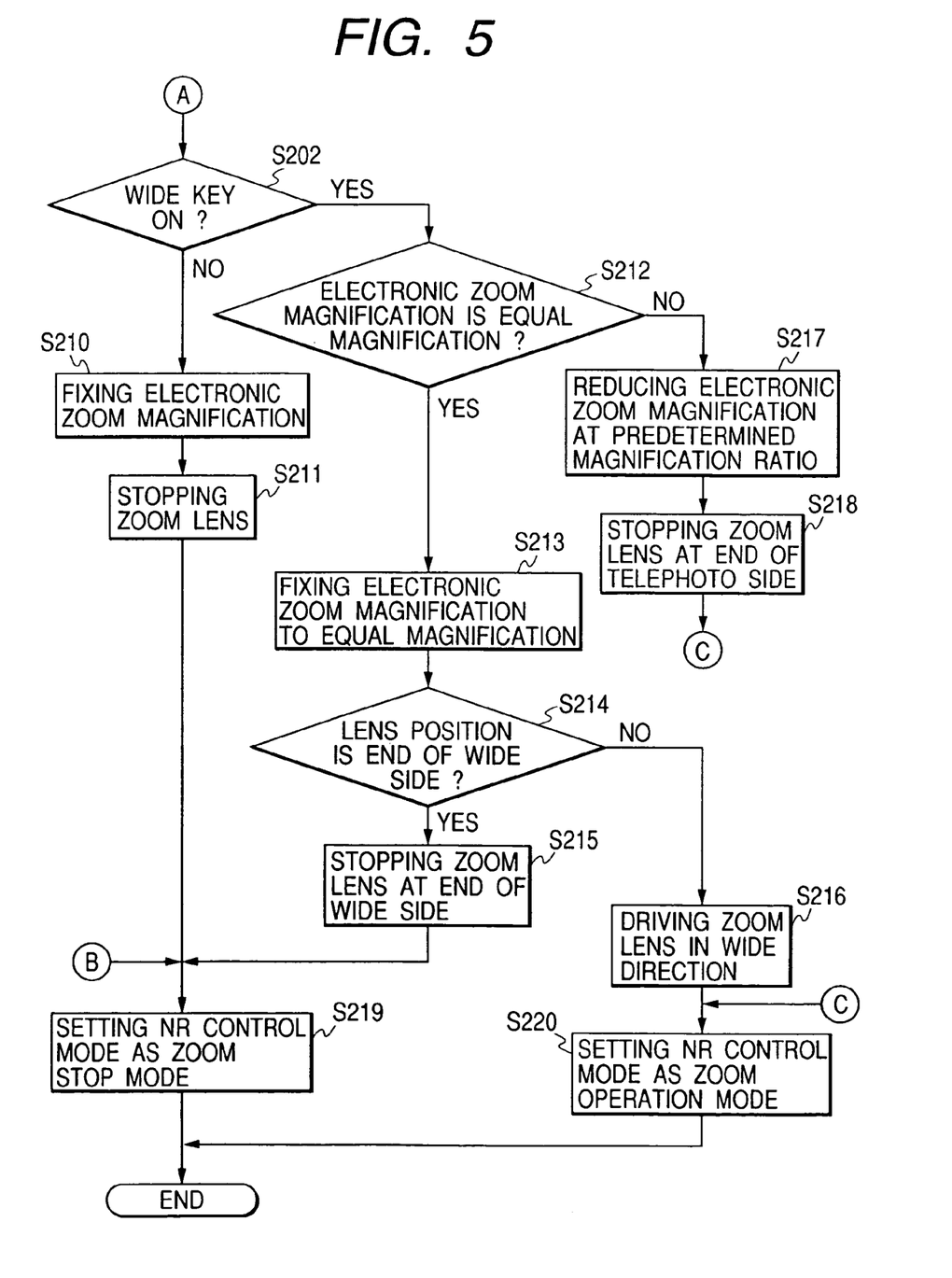
FIG. 5 is a flow chart illustrating the sequence of a noise reduction control process to be followed by the flow chart shown in FIG. 4.

Next, the optical zoom, electronic zoom and noise reduction controls by the system control unit 21 will be described. FIGS. 4 and 5 are flow charts illustrating the noise reduction control process. The program for this process is stored in ROM 32 of the system control unit 21 and executed by CPU 31.

The system control unit 21 determines whether the telephoto zoom key 24 is depressed (Step S201). If depressed, the system control unit checks whether the position of the zoom lens 11 is at the telephoto zoom end (optical zoom magnification factor of 12 times) (Step S203). If the position of the zoom lens 11 is the telephoto end, the zoom lens 11 is fixed to the telephoto end (Step S204).

The system control unit then checks whether the electronic zoom magnification factor of the electronic zoom unit 17 is the maximum of 4 times. If 4 times, the electronic zoom magnification factor is fixed to 4 times (Step S206). If not the maximum of 4 times, the electronic zoom unit 17 is controlled so as to increase the magnification factor to a predetermined value (step S207). In this embodiment, although the maximum magnification factor of the optical zoom is set to 12 times and that of the electronic zoom is set to 4 times, other magnification factors may also be set.

If the position of the zoom lens 11 is not the telephoto end at Step S203, the lens drive unit 20 is controlled so as to move the zoom lens 11 in the telephoto zoom direction and increase the magnification factor to a predetermined value (Step S208). The magnification factor of the electronic zoom is fixed to an equal magnification (Step S209).

If the telephoto zoom key 201 is not depressed at Step S201, the system control unit checks whether the wide-angle zoom key 23 is depressed (Step S202). If depressed, the system control unit checks whether the electronic zoom magnification factor of the electronic zoom unit 17 is the minimum of the equal magnification (Step S212).

If the electronic magnification factor is the minimum of the equal magnification, the electronic zoom unit 17 is controlled so as to fix the electronic zoom magnification factor to the equal magnification. The system control unit then checks whether the position of the zoom lens 11 is the wide-angle end (optical zoom magnification factor of equal magnification) (Step S214). If the position is the wide-angle end, the zoom lens 11 is fixed at the wide-angle end (Step S215).

If the position of the zoom lens 11 is not the wide-angle end, the lens drive unit 20 is controlled so as to move the zoom lens 11 in the wide-angle zoom direction and reduce the magnification factor to a predetermined value (Step S216).

If the electronic zoom magnification factor is not the equal magnification at Step S212, the electronic zoom unit 17 is controlled so as to reduce the magnification factor of the electronic zoom to a predetermined value (Step S217). The zoom lens 11 is fixed to the telephoto end (Step S218).

If the wide-angle zoom key 23 is not depressed at Step S202, the electronic zoom unit 17 is controlled so as to fix the electronic zoom magnification factor without being changed (Step S210). In order to fix the electronic zoom magnification factor of the zoom lens 11, the lens drive unit 20 is controlled so as to stop the zoom lens 11 (Step S211).

Under conditions where the electronic zoom unit 17 and zoom lens 11 are stopped, the noise reduction unit 18 is controlled so as to set the noise reduction control mode to a zoom stop mode (Step S219).

Under conditions where either the electronic zoom unit 17 or the zoom lens 11 is being operated, the noise reduction unit 18 is controlled so as to set the noise reduction control mode to a zoom operation mode (Step S220). Thereafter, the system control unit 21 temporarily terminates the process, and after it controls each component of the image sensing apparatus, it again repeats the process from Step S201 to Step S220.

As described above, according to this embodiment, it is determined whether a zoom variable magnification operation is being executed. In accordance with this determination, the cyclic coefficient of the noise reduction is changed. This method is more effective than the case wherein a motion vector of an image under the variable magnification operation is detected and, in accordance with the detection result, the noise reduction is changed. The reason for this is as follows. Since the mechanism for detecting a motion vector of an image is a feedback loop, there is a delay in changing the noise reduction. Also, the motion vector of an image under a variable magnification operation diverges so that the motion vector of the overall image converges to zero. A proper detection is therefore impossible.

Figure 6:
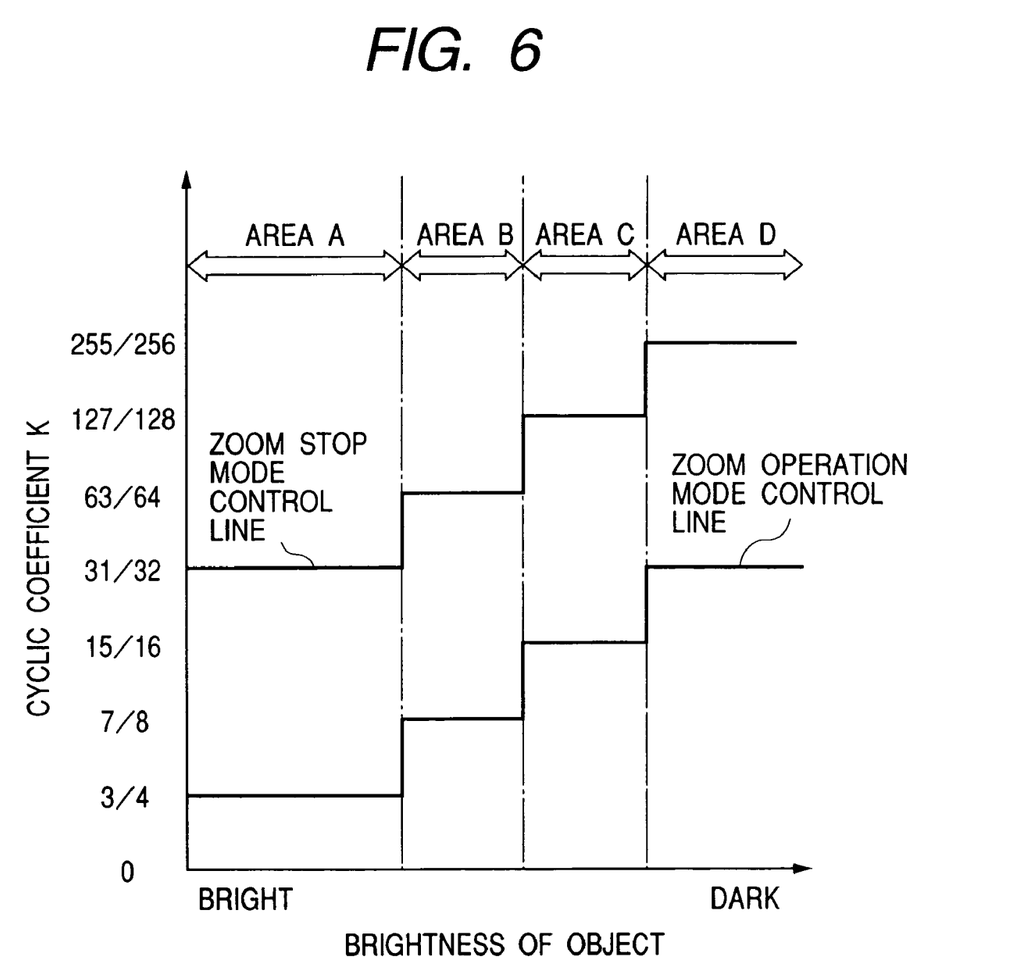
FIG. 6 is a graph showing the relation between the brightness of an object and the value of a cyclic coefficient K in a zoom step mode and in a zoom operation mode.

FIG. 6 is a graph showing the relation between the cyclic coefficient K and the brightness of an object in the zoom stop mode and in the zoom operation mode. Steps S219 and S220 are executed in accordance with the graph shown in FIG. 6. The ordinate represents the cyclic coefficient K of the noise reduction. As the cyclic coefficient K changes from "0" to nearer to "1", the noise reduction amount becomes larger and the latent image becomes more conspicuous. As shown in FIG. 6, the cyclic coefficient K of the noise reduction is set smaller during zoom operation (zoom operation mode) than during a zoom stop mode so as to lower the noise reduction amount. The latent image phenomenon can therefore be suppressed. The abscissa represents the brightness of an object which is determined from the exposure control data. The brightness of an object is divided into levels or areas A, B, C and D, from the bright side, in accordance with a predetermined reference value.

In the zoom stop mode, the cyclic coefficient K of the noise reduction is "31/32" in the brightest area A of an object. As the brightness of the object changes to the area B, the cyclic coefficient is changed to "63/64". As the area changes to the areas C and D, the value is changed to "127/128" and "255/256", respectively. Similarly, as the area changes from area D to area A, the cyclic coefficient is changed from the value "255/256" to the value "31/32".

In the zoom operation mode, the cyclic coefficient K of the noise reduction is "3/4" in the area A. As the area changes to the areas B, C and D, the coefficient changes to the values "7/8", "15/16" and "31/32", respectively, similar to the zoom stop mode.

As above, the cyclic coefficient K of the noise reduction takes the value on a zoom stop mode control line or on a zoom operation mode control line shown in FIG. 6, in accordance with a change in the brightness of an object. The value on the zoom operation mode control line takes a value nearer to "0" than the value on the zoom stop mode control line, at each brightness of an object.

The value of the cyclic coefficient K of the noise reduction may take any value so long as it makes the noise reduction amount of a picked-up image smaller in the zoom operation mode than in the zoom stop mode. The value of the cyclic coefficient K used in this embodiment is not therefore limited only thereto. So long as the value can change the noise reduction amount, a control value other than the cyclic coefficient may also be used.

Figure 7:
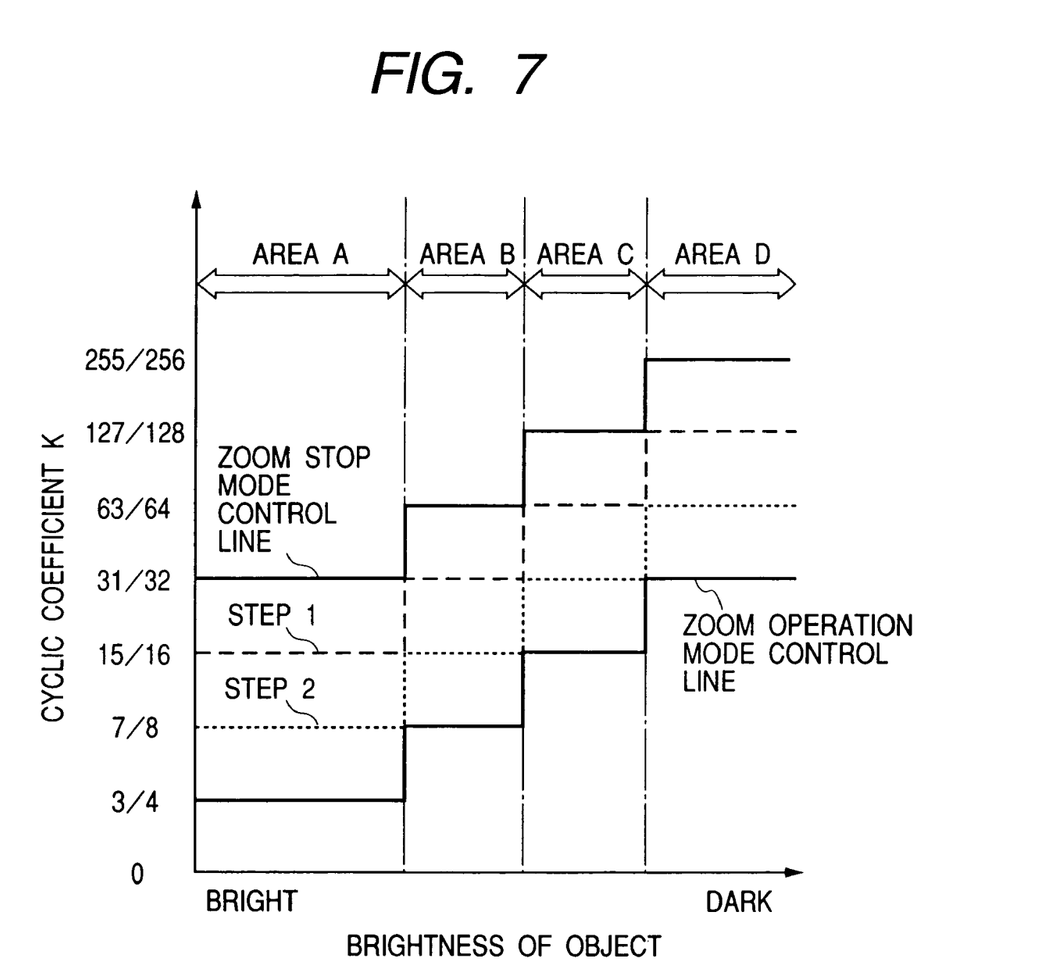
FIG. 7 is a graph showing the relation between the brightness of an object and the value of a cyclic coefficient K in the zoom stop mode and zoom operation mode, and at Steps 1 and 2.

In this embodiment, the cyclic coefficient K of the noise reduction can take the value only on the zoom and the noise reduction control value in the zoom operation mode, intermediate modes Step 1 and Step 2 may be provided between the zoom stop and operation modes, as shown in FIG. 7, so as to use the cyclic coefficients K at Steps 1 and 2 when the mode is being transferred. In this manner, it is possible to suppress the influence, upon images, of switching between noise reduction control values during mode transfer. FIG. 7 is a graph showing the relation between the object brightness and the cyclic coefficient K in the zoom stop and operation modes, and at Steps 1 and 2.

In optical zoom or electronic zoom operations of the present embodiment, a change in the magnification factor per unit time may be increased or decreased so as to stepwise change the zoom speed in accordance with the depression force of the wide-angle zoom key or telephoto zoom key. For example, if the zoom speed is increased more as the key is depressed more strongly, the control value K of the noise reduction is gradually lowered in proportion to the zoom speed to thereby suppress the latent image phenomenon. For example, if the zoom speed has three levels, low speed, middle speed and high speed, Step 1 shown in FIG. 7 is used at the low speed, Step 2 is used at the middle speed, and the zoom operation mode control line is used at the high speed, thereby to lower the value K in proportion to the zoom speed. In this manner, influence of the zoom speed upon images can be suppressed by switching the noise reduction control value.

In this embodiment, a zoom lens 11 for optically changing the size of a picked-up image and an electronic zoom unit 17 for changing the size of a picked-up image through electronic signal processing are used in combination. The present embodiment, however, also is applicable to the case wherein either only the zoom lens 11 or the electronic zoom unit 17 is used.

In this embodiment, as shown in FIG. 1, a video signal is processed by the electronic zoom unit 17, for electronic zoom of an image, and thereafter, the noise reduction unit 18 performs a noise reduction operation. In another embodiment of the present invention, as shown in FIG. 9, an electronic zoom unit 17 may be provided as the succeeding stage of a noise reduction unit 18.

Figure 9:
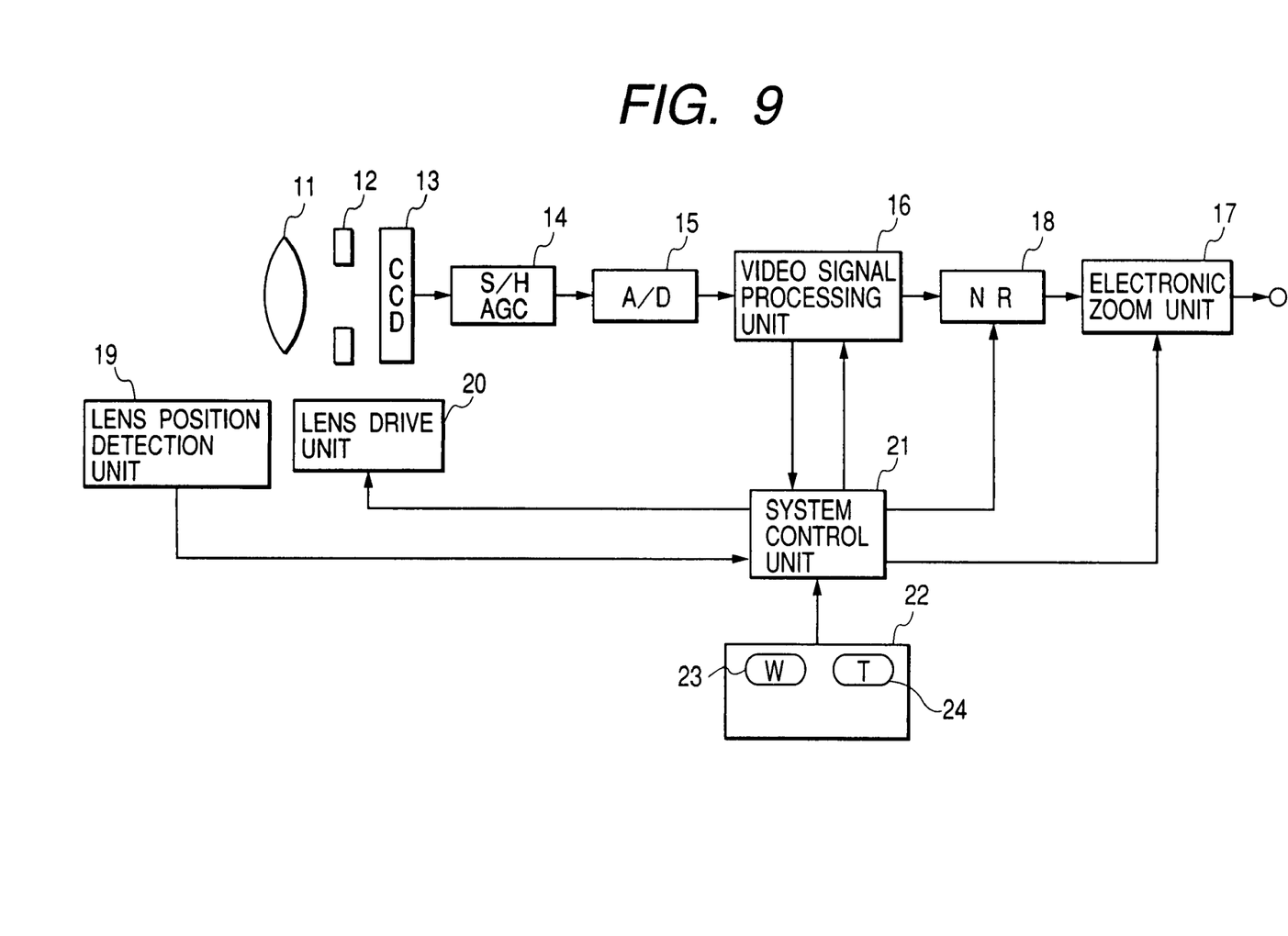
FIG. 9 is a block diagram showing the structure of an image sensing apparatus according to another embodiment.
Figure 10:
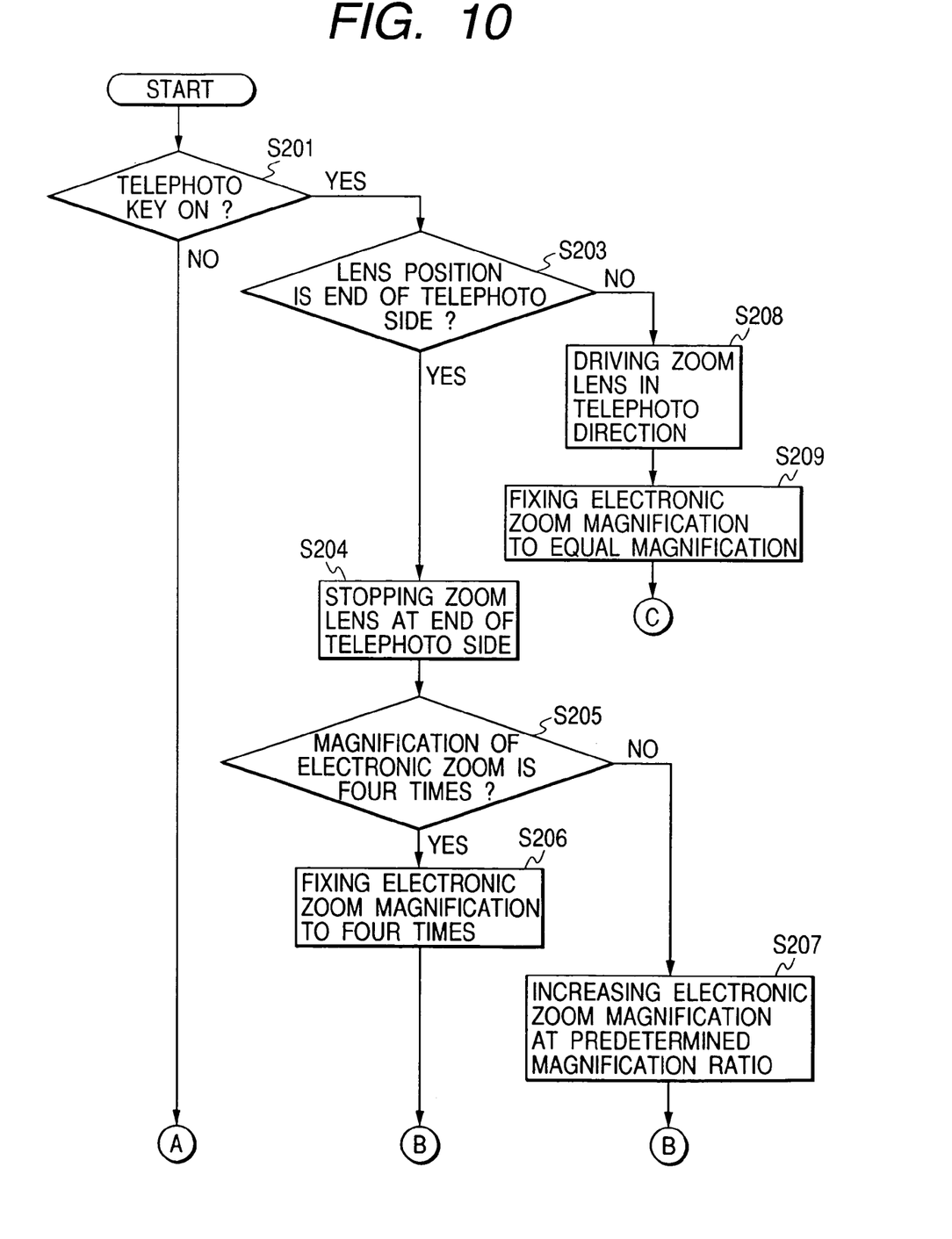
FIG. 10 is a flow chart illustrating the sequence of a noise reduction control process.
Figure 11:
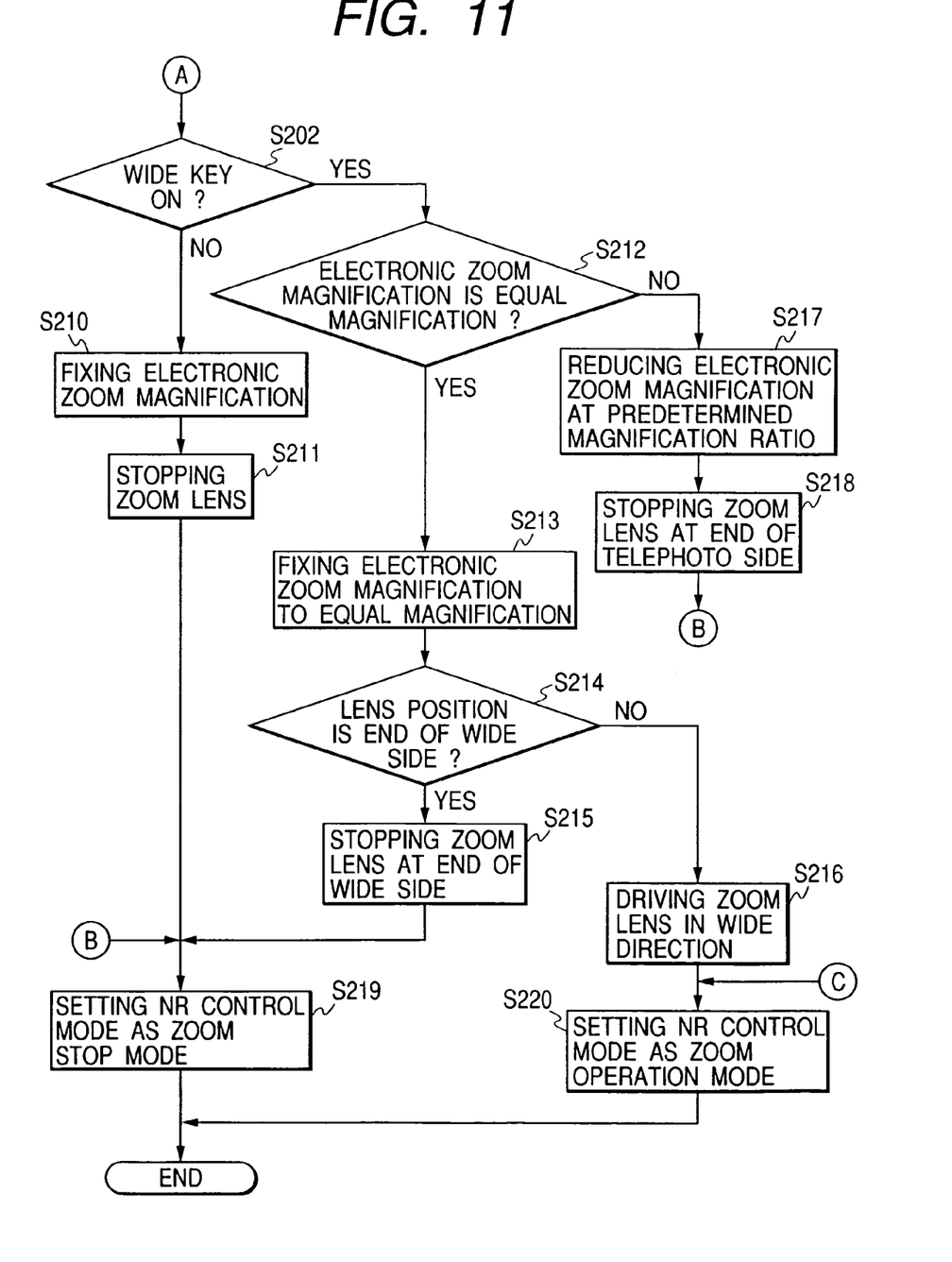
FIG. 11 is a flow chart illustrating the sequence of a noise reduction control process to be followed by the flow chart shown in FIG. 10.

FIGS. 10 and 11 are flow charts illustrating the operation of an image sensing apparatus having the structure shown in FIG. 9. In the flow charts shown in FIGS. 10 and 11, steps having reference numerals identical to those shown in FIGS. 4 and 5 execute operations similar to those described with reference to FIGS. 4 and 5, and the descriptions thereof are omitted here.

At Step S207 shown in FIG. 10, if an image magnification operation is being executed by electronic zoom, the process flow advances to Step S219 where noise reduction is switched to the zoom stop mode so as to increase the noise reduction cyclic coefficient K similar to the case in which the zoom operation is stopped.

At Step S217 shown in FIG. 11, if an image reduction operation is being executed by the electronic zoom, the zoom lens 11 is stopped at the telephoto end (Step S218) to thereafter follow Step S219, where noise reduction is switched to the zoom stop mode so as to increase the noise reduction cyclic coefficient K, similar to the case in which the zoom operation is stopped.

In this embodiment, while electronic zoom is executed, even if the cyclic coefficient K of noise reduction is made large, similar to the coefficient K of the zoom stop mode, the latent image phenomenon will not occur while electronic zoom is executed and noise can be reduced, because the electronic zoom is executed after noise reduction of the video signal.

The present invention also is applicable to a system constituted of a plurality of apparatuses or to a single apparatus. It is obvious that the object of the invention can be achieved by supplying a system or apparatus with a software program. In this case, the system or apparatus reads the program stored in a storage medium to realize the functions and effects of the present invention.

Figure 8:
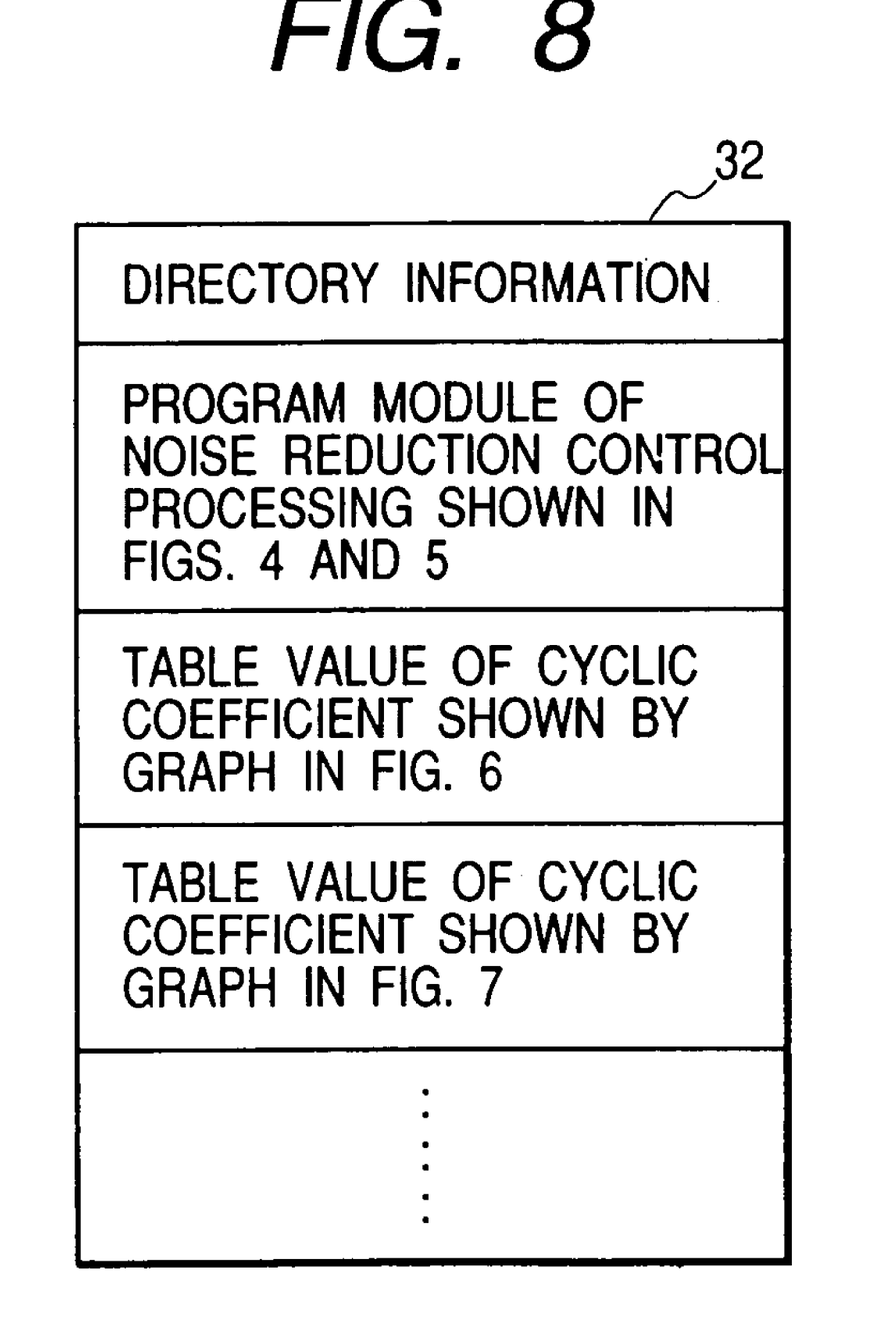
FIG. 8 is a memory map of a ROM as a storage medium.

FIG. 8 is a memory map of ROM 32 functioning as such a storage medium. ROM 32 stores a noise reduction control program module realizing the process of the flow charts shown in FIGS. 4 and 5, the table values of the cyclic coefficient K shown in the graph of FIG. 6, and the table values of the cyclic coefficient K shown in the graph of FIG. 7.

The storage medium storing the program module is not limited only to a ROM; other media may be used, such as a floppy disk, a hard disk, an optical disk, a magnetooptical disk, a CD-ROM, a CD-R, a DVD, a magnetic tape, and a nonvolatile memory card.

The scope of the present invention also contains the case wherein the functions of each embodiment can be realized by writing program codes read from the storage medium into a memory of a function expansion board inserted into a computer, or of a function expansion unit connected to the computer, and thereafter by executing a portion or the entirety of actual processes by a CPU of the function expansion board or function expansion unit.

As described so far, according to the image sensing apparatus of the above embodiments, the control value of the noise reduction unit is set to a value providing a smaller noise reduction amount in the variable magnification operation mode than in the variable magnification stop mode. Therefore, irrespective of the telephoto or wide-angle zoom operation direction, the noise reduction amount is set smaller in the zoom operation mode than in the zoom stop mode, so that the latent image phenomenon caused by a change in the size of an object image during the zoom operation mode can be suppressed.

According to the image sensing apparatus of the above embodiments, the control value of the noise reduction is changed with a control value for the exposure adjustment which maintains the level of a generated video signal constant irrespective of the amount of light from an object. It is therefore possible to increase the noise reduction amount so as to compensate for the S/N ratio of a video signal to be degraded by the dark brightness of an object. The present invention therefore is applicable to provide a larger noise reduction amount of an object at a low brightness more than that of an object at a sufficient brightness.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image sensing apparatus comprising:
    a noise reduction device that, utilizing time correlation of sensed images, reduces noise added to the sensed images;
    a zoom controller that controls a zoom magnification factor of the image sensing apparatus;
    a determination device that determines whether said zoom controller is executing a zoom operation;
    a setting device that sets a control value for time correlation in said noise reduction device in accordance with a determination by said determination device;
    an optical zoom device that performs optical zooming of an image of an object; and
    an electronic zoom device that performs processing of the image of the object,
    wherein said zoom controller controls said optical zoom device for optically zooming the image of the object and said electronic zoom device for electronically processing the image of the object, and
    wherein said electronic zoom device executes a zoom operation for an image in which noise has been reduced by said noise reduction device and said setting device sets the control value to a control value providing a lower noise reduction amount than a noise reduction amount to be used when said electronic zoom device executes the zoom operation, when it is determined that said optical zoom device executes the zoom operation.

2. The image sensing apparatus according to claim 1, wherein said setting device sets the control value for said noise reduction device in accordance with a magnification factor per unit time used by said zoom controller.

3. The image sensing apparatus according to claim 1, further comprising an exposure control device that controls an exposure of the picked-up image, wherein said setting device changes the control value for said noise reduction device in accordance with a control value for said exposure control device.

4. The image sensing apparatus according to claim 1, wherein said setting device stepwise changes the control value for said noise reduction device when a zoom operation switches from an execution state to a stop state.

5. The image sensing apparatus according to claim 1, wherein said setting device stepwise changes the control value for said noise reduction device when a zoom operation switches from a stop state to an execution state.

6. An image sensing method for an image sensing apparatus, comprising the steps of:
    reducing noise added to a sensed image, utilizing time correlation of sensed images;
    controlling a zoom magnification factor of the image sensing apparatus;
    optically zooming an image of an object, wherein said controlling step controls optically zooming the image of the object;
    electronically zooming an image of the object, wherein said controlling step controls electronically processing the image of the object in said electronically zooming step;
    determining whether a zoom operation is being executed in said controlling step; and
    setting a control value for time correlation in said noise reduction step in accordance with a determination in said determining step,
    wherein said electronically zooming step executes the zoom operation for an image in which noise has been reduced in said noise reducing step, and said setting step sets the control value to a control value providing a lower noise reduction amount than a noise reduction amount to be used when said electronically zooming step executes a zoom operation, when it is determined that an optical zoom operation is being executed.

7. The method according to claim 6, wherein said setting step sets the control value for said noise reduction step in accordance with a magnification factor per unit time used at said zoom control step.

8. The method according to claim 6, further comprising a step of controlling an exposure of the picked-up image, wherein said setting step changes the control value for said noise reduction step in accordance with a control value for said exposure control step.

9. The method according to claim 6, wherein said setting step stepwise changes the control value for said noise reduction step when the zoom operation switches from an execution state to a stop state.

10. The method according to claim 6, wherein said setting step stepwise changes the control value for said noise reduction step when the zoom operation switches from a stop state to an execution state.

11. A computer program stored on a computer readable storage medium for executing an image sensing method for an image sensing apparatus, said method comprising the steps of:
    reducing noise added to a sensed image, utilizing time correlation of sensed images;
    controlling a zoom magnification factor of the image sensing apparatus;
    optically zooming an image of an object, wherein said controlling step controls optically zooming the image of the object;
    electronically zooming an image of the object, wherein said controlling step controls electronically processing the image of the object in said electronically zooming step;
    determining whether a zoom operation is being executed in said controlling step; and
    setting a control value for time correlation in said noise reduction step in accordance with a determination in said determining step,
    wherein said electronically zooming step executes a zoom operation for an image in which noise has been reduced in said noise reducing step, and said setting step sets the control value to a control value providing a lower noise reduction amount than a noise reduction amount to be used when said electronically zooming step executes the zoom operation, when it is determined that an optical zoom operation is being executed.

* * * * *